United States Patent
Chandler et al.

(10) Patent No.: US 10,596,550 B2
(45) Date of Patent: *Mar. 24, 2020

(54) THREE LAYER NO$_x$ ADSORBER CATALYST

(71) Applicant: JOHNSON MATTHEY PUBLIC LIMITED COMPANY, London (GB)

(72) Inventors: Guy Richard Chandler, Royston (GB); Paul Richard Phillips, Royston (GB); Stuart David Reid, Royston (GB); Byron Truscott, Royston (GB)

(73) Assignee: Johnson Matthey Public Limited Company, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 15/937,992

(22) Filed: Mar. 28, 2018

(65) Prior Publication Data
US 2018/0311647 A1 Nov. 1, 2018

(30) Foreign Application Priority Data
Mar. 29, 2017 (GB) .................................. 1705005.5

(51) Int. Cl.
| | | |
|---|---|---|
| *B01J 23/63* | (2006.01) | |
| *B01J 35/00* | (2006.01) | |
| *B01J 35/04* | (2006.01) | |
| *B01D 53/94* | (2006.01) | |
| *F01N 3/08* | (2006.01) | |
| *B01J 37/00* | (2006.01) | |
| *B01J 37/08* | (2006.01) | |
| *B01J 23/00* | (2006.01) | |
| *B01J 37/03* | (2006.01) | |
| *B01J 35/02* | (2006.01) | |
| *B01J 37/02* | (2006.01) | |
| *B01D 46/00* | (2006.01) | |

(52) U.S. Cl.
CPC .......... *B01J 23/63* (2013.01); *B01D 46/0027* (2013.01); *B01D 53/9422* (2013.01); *B01J 23/002* (2013.01); *B01J 35/0006* (2013.01); *B01J 35/023* (2013.01); *B01J 35/04* (2013.01); *B01J 37/0009* (2013.01); *B01J 37/0036* (2013.01); *B01J 37/0045* (2013.01); *B01J 37/0244* (2013.01); *B01J 37/038* (2013.01); *B01J 37/086* (2013.01); *B01J 37/088* (2013.01); *F01N 3/0814* (2013.01); *F01N 3/0842* (2013.01); *B01D 2255/1021* (2013.01); *B01D 2255/1023* (2013.01); *B01D 2255/1025* (2013.01); *B01D 2255/2042* (2013.01); *B01D 2255/2065* (2013.01); *B01D 2255/9025* (2013.01); *B01D 2255/91* (2013.01); *B01D 2258/014* (2013.01); *B01J 2523/00* (2013.01); *F01N 2510/0684* (2013.01); *Y02T 10/22* (2013.01); *Y02T 10/24* (2013.01)

(58) Field of Classification Search
CPC ......... B01J 23/63; B01J 35/0006; B01J 35/04
See application file for complete search history.

(56) References Cited

U.S. PATENT DOCUMENTS

| | | | | |
|---|---|---|---|---|
| 6,777,370 | B2 * | 8/2004 | Chen ..................... | B01D 53/945 502/241 |
| 8,273,681 | B2 * | 9/2012 | Naito ................... | B01D 53/945 502/302 |
| 8,551,908 | B2 * | 10/2013 | Satou ................... | B01D 53/945 502/262 |
| 8,592,337 | B2 * | 11/2013 | Hilgendorff ....... | B01D 53/9422 502/304 |
| 8,641,993 | B2 * | 2/2014 | Dotzel ................ | B01J 23/30 423/213.2 |
| 8,734,743 | B2 * | 5/2014 | Muller-Stach ....... | B01D 53/945 423/213.5 |
| 8,784,759 | B2 * | 7/2014 | Hilgendorff ......... | B01J 37/0036 422/170 |
| 8,833,064 | B2 * | 9/2014 | Galligan .............. | B01D 53/945 60/299 |
| 8,906,330 | B2 * | 12/2014 | Hilgendorff ........... | B01J 23/464 423/213.5 |
| 9,156,023 | B2 * | 10/2015 | Klingmann .......... | B01D 53/945 |
| 9,266,092 | B2 * | 2/2016 | Arnold .................... | B01J 23/63 |
| 9,422,927 | B2 * | 8/2016 | Tanigawa .............. | C10M 169/04 |
| 9,550,176 | B2 * | 1/2017 | Sato ........................ | B01J 37/03 |
| 9,604,175 | B2 * | 3/2017 | Hatfield ............... | B01D 53/945 |
| 9,616,386 | B2 * | 4/2017 | Hatanaka ............... | B01J 21/066 |
| 9,616,410 | B2 * | 4/2017 | Okada ................... | B01D 53/945 |
| 9,636,634 | B2 * | 5/2017 | Chiffey .................... | B01J 23/66 |
| 9,662,638 | B2 * | 5/2017 | Hoyer ................... | B01J 37/0244 |
| 9,675,970 | B2 * | 6/2017 | Matsueda ............ | B01J 35/0006 |
| 9,828,896 | B2 * | 11/2017 | Swallow ............... | F01N 3/2066 |
| 9,833,771 | B2 * | 12/2017 | Goto ........................ | B01J 23/63 |
| 9,861,961 | B2 * | 1/2018 | Umeno ............. | B01D 53/9422 |
| 9,890,676 | B2 * | 2/2018 | Kawabata ............ | B01J 37/0244 |
| 9,999,871 | B2 * | 6/2018 | Aoki ................... | B01J 35/0006 |
| 10,022,705 | B2 * | 7/2018 | Kimura ................... | B01J 23/63 |
| 10,118,156 | B2 * | 11/2018 | Horaguchi ......... | B01D 53/9422 |
| 10,137,414 | B2 * | 11/2018 | Hoke ................... | B01D 53/945 |

(Continued)

FOREIGN PATENT DOCUMENTS

WO    WO-2011154913 A1    12/2011

*Primary Examiner* — Cam N. Nguyen

(57) ABSTRACT

A lean NO$_x$ trap catalyst and its use in an emission treatment system for internal combustion engines is disclosed. The lean NO$_x$ trap catalyst comprises a first layer, a second layer, and a third layer.

19 Claims, No Drawings

(56) References Cited

U.S. PATENT DOCUMENTS

| | | | |
|---|---|---|---|
| 10,150,082 B2* | 12/2018 | Yoshikawa | B01D 53/945 |
| 10,213,741 B2* | 2/2019 | Sato | B01J 23/42 |
| 10,213,768 B2* | 2/2019 | Chandler | B01D 53/9422 |
| 2003/0021745 A1 | 1/2003 | Chen | |
| 2004/0198595 A1* | 10/2004 | Chen | B01D 53/945 |
| | | | 502/328 |
| 2005/0164879 A1* | 7/2005 | Chen | B01D 53/9422 |
| | | | 502/328 |
| 2008/0044330 A1 | 2/2008 | Chen et al. | |
| 2008/0120970 A1* | 5/2008 | Hilgendorff | B01D 53/9422 |
| | | | 60/299 |
| 2008/0219906 A1 | 9/2008 | Chen et al. | |
| 2009/0257933 A1 | 10/2009 | Chen et al. | |
| 2011/0305612 A1 | 12/2011 | Muller-Stach et al. | |
| 2012/0055142 A1 | 3/2012 | Hilgendorff | |
| 2013/0189173 A1 | 7/2013 | Hilgendorff et al. | |
| 2013/0336865 A1 | 12/2013 | Brisley et al. | |
| 2015/0190793 A1 | 7/2015 | Swallow et al. | |
| 2015/0336085 A1 | 11/2015 | Hoyer et al. | |

* cited by examiner

THREE LAYER NO$_x$ ADSORBER CATALYST

FIELD OF THE INVENTION

The invention relates to a lean NO$_x$ trap catalyst, a method of treating an exhaust gas from an internal combustion engine, and emission systems for internal combustion engines comprising the lean NO$_x$ trap catalyst.

BACKGROUND OF THE INVENTION

Internal combustion engines produce exhaust gases containing a variety of pollutants, including nitrogen oxides ("NO$_x$"), carbon monoxide, and uncombusted hydrocarbons, which are the subject of governmental legislation. Increasingly stringent national and regional legislation has lowered the amount of pollutants that can be emitted from such diesel or gasoline engines. Emission control systems are widely utilized to reduce the amount of these pollutants emitted to atmosphere, and typically achieve very high efficiencies once they reach their operating temperature (typically, 200° C. and higher). However, these systems are relatively inefficient below their operating temperature (the "cold start" period).

One exhaust gas treatment component utilized to clean exhaust gas is the NO$_x$ adsorber catalyst (or "NO$_x$ trap"). NO$_x$ adsorber catalysts are devices that adsorb NO$_x$ under lean exhaust conditions, release the adsorbed NO$_x$ under rich conditions, and reduce the released NO$_x$ to form N$_2$. A NO$_x$ adsorber catalyst typically includes a NO$_x$ adsorbent for the storage of NO$_x$ and an oxidation/reduction catalyst.

The NO$_x$ adsorbent component is typically an alkaline earth metal, an alkali metal, a rare earth metal, or combinations thereof. These metals are typically found in the form of oxides. The oxidation/reduction catalyst is typically one or more noble metals, preferably platinum, palladium, and/or rhodium. Typically, platinum is included to perform the oxidation function and rhodium is included to perform the reduction function. The oxidation/reduction catalyst and the NO$_x$ adsorbent are typically loaded on a support material such as an inorganic oxide for use in the exhaust system.

The NO$_x$ adsorber catalyst performs three functions. First, nitric oxide reacts with oxygen to produce NO$_2$ in the presence of the oxidation catalyst. Second, the NO$_2$ is adsorbed by the NO$_x$ adsorbent in the form of an inorganic nitrate (for example, BaO or BaCO$_3$ is converted to Ba(NO$_3$)$_2$ on the NO$_x$ adsorbent). Lastly, when the engine runs under rich conditions, the stored inorganic nitrates decompose to form NO or NO$_2$ which are then reduced to form N$_2$ by reaction with carbon monoxide, hydrogen and/or hydrocarbons (or via NH$_x$ or NCO intermediates) in the presence of the reduction catalyst. Typically, the nitrogen oxides are converted to nitrogen, carbon dioxide and water in the presence of heat, carbon monoxide and hydrocarbons in the exhaust stream.

PCT Intl. Appl. WO 2004/076829 discloses an exhaust-gas purification system which includes a NO$_x$ storage catalyst arranged upstream of an SCR catalyst. The NO$_x$ storage catalyst includes at least one alkali, alkaline earth, or rare earth metal which is coated or activated with at least one platinum group metal (Pt, Pd, Rh, or Ir). A particularly preferred NO$_x$ storage catalyst is taught to include cerium oxide coated with platinum and additionally platinum as an oxidizing catalyst on a support based on aluminium oxide. EP 1027919 discloses a NO$_x$ adsorbent material that comprises a porous support material, such as alumina, zeolite, zirconia, titania, and/or lanthana, and at least 0.1 wt % precious metal (Pt, Pd, and/or Rh). Platinum carried on alumina is exemplified.

In addition, U.S. Pat. Nos. 5,656,244 and 5,800,793 describe systems combining a NO$_x$ storage/release catalyst with a three way catalyst. The NO$_x$ adsorbent is taught to comprise oxides of chromium, copper, nickel, manganese, molybdenum, or cobalt, in addition to other metals, which are supported on alumina, mullite, cordierite, or silicon carbide.

PCT Intl. Appl. WO 2009/158453 describes a lean NO$_x$ trap catalyst comprising at least one layer containing NO$_x$ trapping components, such as alkaline earth elements, and another layer containing ceria and substantially free of alkaline earth elements. This configuration is intended to improve the low temperature, e.g. less than about 250° C., performance of the LNT.

US 2015/0336085 describes a nitrogen oxide storage catalyst composed of at least two catalytically active coatings on a support body. The lower coating contains cerium oxide and platinum and/or palladium. The upper coating, which is disposed above the lower coating, contains an alkaline earth metal compound, a mixed oxide, and platinum and palladium. The nitrogen oxide storage catalyst is said to be particularly suitable for the conversion of NO$_x$ in exhaust gases from a lean burn engine, e.g. a diesel engine, at temperatures of between 200 and 500° C.

Conventional lean NO$_x$ trap catalysts often have significantly different activity levels between activated and deactivated states. This can lead to inconsistent performance of the catalyst, both over the lifetime of the catalyst and in response to short term changes in exhaust gas composition. This presents challenges for engine calibration, and can cause poorer emissions profiles as a result of the changing performance of the catalyst.

As with any automotive system and process, it is desirable to attain still further improvements in exhaust gas treatment systems. We have discovered a new NO$_x$ adsorber catalyst composition with improved NO$_x$ storage and conversion characteristics, as well as improved CO conversion. It has surprisingly been found that these improved catalyst characteristics are observed in both the active and deactivated states.

SUMMARY OF THE INVENTION

In a first aspect of the invention there is provided a lean NO$_x$ trap catalyst, comprising:
  i) a first layer, said first layer comprising one or more platinum group metals, a first ceria-containing material, an alkali or alkaline earth metal, and a first inorganic oxide;
  ii) a second layer, said second layer comprising one or more noble metals, a second ceria-containing material, and a second inorganic oxide; and
  iii) a third layer, said third layer comprising one or more noble metals having reducing activity and a third inorganic oxide.

In a second aspect of the invention there is provided an emission treatment system for treating a flow of a combustion exhaust gas comprising the lean NO$_x$ trap catalyst as hereinbefore defined.

In a third aspect of the invention there is provided a method of treating an exhaust gas from an internal combustion engine comprising contacting the exhaust gas with the lean $NO_x$ trap catalyst as hereinbefore defined.

Definitions

The term "washcoat" is well known in the art and refers to an adherent coating that is applied to a substrate, usually during production of a catalyst.

The acronym "PGM" as used herein refers to "platinum group metal". The term "platinum group metal" generally refers to a metal selected from the group consisting of ruthenium, rhodium, palladium, osmium, iridium and platinum, preferably a metal selected from the group consisting of ruthenium, rhodium, palladium, iridium and platinum. In general, the term "PGM" preferably refers to a metal selected from the group consisting of rhodium, platinum and palladium.

The term "noble metal" as used herein refers to generally refers to a metal selected from the group consisting of ruthenium, rhodium, palladium, silver, osmium, iridium, platinum, and gold. In general, the term "noble metal" preferably refers to a metal selected from the group consisting of rhodium, platinum, palladium and gold.

The term "noble metal having reducing activity" as used herein refers to a metal selected from the group consisting of ruthenium, rhodium, palladium, silver, osmium, iridium, platinum, and gold that is known to be catalytically active in reduction reactions, e.g. the reduction of $NO_x$ gases to $NH_3$ or $N_2$, or of $CO_2$ or CO to hydrocarbons. In general, the term "noble metal having reducing activity" preferably refers to a metal selected from the group consisting of ruthenium, rhodium, iridium, platinum and palladium.

The term "mixed oxide" as used herein generally refers to a mixture of oxides in a single phase, as is conventionally known in the art. The term "composite oxide" as used herein generally refers to a composition of oxides having more than one phase, as is conventionally known in the art.

The expression "substantially free of" as used herein with reference to a material means that the material may be present in a minor amount, such as ≤5% by weight, preferably ≤2% by weight, more preferably ≤1% by weight. The expression "substantially free of" embraces the expression "does not comprise". The term "loading" as used herein refers to a measurement in units of $g/ft^3$ on a metal weight basis.

DETAILED DESCRIPTION OF THE INVENTION

The lean $NO_x$ trap catalyst of the invention comprises:
i) a first layer, said first layer comprising one or more platinum group metals, a first ceria-containing material, an alkali or alkaline earth metal, and a first inorganic oxide;
ii) a second layer, said second layer comprising one or more noble metals, a second inorganic oxide, and a second ceria-containing material; and
iii) a third layer, said third layer comprising one or more noble metals having reducing activity and a third inorganic oxide.

The one or more platinum group metals is preferably selected from the group consisting of palladium, platinum, rhodium, and mixtures thereof. Particularly preferably, the one or more platinum group metals is a mixture or alloy of platinum and palladium, preferably wherein the ratio of platinum to palladium is from 2:1 to 12:1 on a w/w basis, especially preferably about 5:1 on a w/w basis.

The lean $NO_x$ trap catalyst preferably comprises 0.1 to 10 weight percent PGM, more preferably 0.5 to 5 weight percent PGM, and most preferably 1 to 3 weight percent PGM. The PGM is preferably present in an amount of 1 to 100 $g/ft^3$, more preferably 10 to 80 $g/ft^3$, most preferably 20 to 60 $g/ft^3$.

Preferably the one or more platinum group metals do not comprise or consist of rhodium. In other words, the first layer is preferably substantially free of rhodium.

The one or more platinum group metals are generally in contact with the first ceria-containing material. Preferably the one or more platinum group metals are supported on the first ceria-containing material. Alternatively or additionally, the one or more platinum group metals are supported on the first inorganic oxide.

The first ceria-containing material is preferably selected from the group consisting of cerium oxide, a ceria-zirconia mixed oxide, and an alumina-ceria-zirconia mixed oxide. Preferably the first ceria-containing material comprises bulk ceria. The first ceria-containing material may function as an oxygen storage material. Alternatively, or in addition, the first ceria-containing material may function as a $NO_x$ storage material, and/or as a support material for the one or more platinum group metals and/or the alkali or alkaline earth metal.

The alkali or alkaline earth metal may be deposited on the first ceria-containing material. Alternatively, or in addition, the alkali or alkaline earth metal may be deposited on the first inorganic oxide. That is, in some embodiments, the alkali or alkaline earth metal may be deposited on, i.e. present on, both the first ceria-containing material and the first inorganic oxide.

The alkali or alkaline earth metal is generally in contact with the first inorganic oxide. Preferably the alkali or alkaline earth metal is supported on the first inorganic oxide. In addition to, or alternatively to, being in contact with the first inorganic oxide, the alkali or alkaline earth metal may be in contact with the first ceria-containing material.

The alkali or alkaline earth metal is preferably barium. Barium, where present, is included as a $NO_x$ storage material, i.e. the first layer may be a $NO_x$ storage layer. Preferably the barium, where present, is present in an amount of 0.1 to 10 wt %, and more preferably 0.5 to 5 weight percent barium, e.g. about 4.5 weight percent barium, expressed as a weight % of the composition.

Preferably the barium is present as a $CeO_2$—$BaCO_3$ composite material. Such a material can be preformed by any method known in the art, for example incipient wetness impregnation or spray-drying.

The first inorganic oxide is preferably an oxide of Groups 2, 3, 4, 5, 13 and 14 elements The first inorganic oxide is preferably selected from the group consisting of alumina, ceria, magnesia, silica, titania, zirconia, niobia, tantalum oxides, molybdenum oxides, tungsten oxides, and mixed oxides or composite oxides thereof. Particularly preferably, the first inorganic oxide is alumina, ceria, or a magnesia/alumina composite oxide. One especially preferred inorganic oxide is a magnesia/alumina composite oxide.

The first inorganic oxide may be a support material for the one or more platinum group metals, and/or for the alkali or alkaline earth metal.

Preferred first inorganic oxides preferably have a surface area in the range 10 to 1500 $m^2/g$, pore volumes in the range 0.1 to 4 mL/g, and pore diameters from about 10 to 1000 Angstroms. High surface area inorganic oxides having a surface area greater than 80 $m^2/g$ are particularly preferred, e.g. high surface area ceria or alumina. Other preferred first inorganic oxides include magnesia/alumina composite oxides, optionally further comprising a cerium-containing component, e.g. ceria. In such cases the ceria may be present on the surface of the magnesia/alumina composite oxide, e.g. as a coating.

The one or more noble metals is preferably selected from the group consisting of palladium, platinum, rhodium, silver, gold, and mixtures thereof. Particularly preferably, the one or more noble metals is a mixture or alloy of platinum and palladium, preferably wherein the ratio of platinum to palladium is from 2:1 to 10:1 on a w/w basis, especially preferably about 5:1 on a w/w basis.

Preferably the one or more noble metals do not comprise or consist of rhodium. In other words, the second layer is preferably substantially free of rhodium. In some embodiments therefore the first layer and the second layer are preferably substantially free of rhodium. This may be advantageous as rhodium can negatively affect the catalytic activity of other catalytic metals, such as platinum, palladium, or mixtures and/or alloys thereof.

The one or more noble metals are generally in contact with the second ceria-containing material. Preferably the one or more noble metals are supported on the second ceria-containing material. In addition to, or alternatively to, being in contact with the second ceria-containing material, the one or more noble metals may be in contact with the second inorganic oxide.

The second inorganic oxide is preferably an oxide of Groups 2, 3, 4, 5, 13 and 14 elements The second inorganic oxide is preferably selected from the group consisting of alumina, ceria, magnesia, silica, titania, zirconia, niobia, tantalum oxides, molybdenum oxides, tungsten oxides, and mixed oxides or composite oxides thereof. Particularly preferably, the second inorganic oxide is alumina, ceria, or a magnesia/alumina composite oxide. One especially preferred second inorganic oxide is alumina.

The second inorganic oxide may be a support material for the one or more noble metals.

Preferred second inorganic oxides preferably have a surface area in the range 10 to 1500 m$^2$/g, pore volumes in the range 0.1 to 4 mL/g, and pore diameters from about 10 to 1000 Angstroms. High surface area inorganic oxides having a surface area greater than 80 m$^2$/g are particularly preferred, e.g. high surface area ceria or alumina. Other preferred second inorganic oxides include magnesia/alumina composite oxides, optionally further comprising a cerium-containing component, e.g. ceria. In such cases the ceria may be present on the surface of the magnesia/alumina composite oxide, e.g. as a coating.

The second ceria-containing material is preferably selected from the group consisting of cerium oxide, a ceria-zirconia mixed oxide, and an alumina-ceria-zirconia mixed oxide. Preferably the second ceria-containing material comprises bulk ceria. The second ceria-containing material may function as an oxygen storage material. Alternatively, or in addition, the second ceria-containing material may function as a NO$_x$ storage material, and/or as a support material for the one or more noble metals.

The second layer may function as an oxidation layer, e.g. a diesel oxidation catalyst layer suitable for the oxidation of hydrocarbons to CO$_2$ and/or CO, and/or suitable for the oxidation of NO to NO$_2$.

In some preferred lean NO$_x$ trap catalysts of the invention, the total loading of the one or more platinum group metals in the first layer is lower than the total loading of the one or more noble metals in the second layer. In such catalysts, preferably the ratio of the total loading of the one or more noble metals in the second layer to the total loading of the one or more platinum group metals in the first layer is at least 2:1 on a w/w basis.

In further preferred lean NO$_x$ trap catalysts of the invention, the total loading of the first ceria-containing material is greater than the total loading of the second ceria-containing material. In such catalysts, preferably the ratio of the total loading of the first ceria-containing material is greater than the total loading of the second ceria-containing material by at least 2:1 on a w/w basis, preferably at least 3:1 on a w/w basis, more preferably at least 5:1 on a w/w basis, particularly preferably at least 7:1 on a w/w basis.

It has surprisingly been found that lean NO$_x$ trap catalysts in which the total loading of the one or more platinum group metals in the first layer is lower than the total loading of the one or more noble metals in the second layer, and/or the total loading of the first ceria-containing material is greater than the total loading of the second ceria-containing material, have improved catalytic performance. Such catalysts have been found to show greater NO$_x$ storage properties and CO oxidation activity compared to lean NO$_x$ trap catalysts of the art.

It has further surprisingly been found that lean NO$_x$ trap catalysts as described herein in which a ceria-containing material, e.g. ceria, is present in the second layer, have improved performance relative to an equivalent catalyst that does not contain a ceria-containing material in the second layer. This finding is particularly surprising in that it is expected that the presence of a ceria-containing material, e.g. ceria, in the second layer would lead to a decrease in the oxidation of NO to NO$_2$, as ceria would be expected to catalyst the reverse reaction, i.e. reduce NO$_2$. The inventors have surprisingly found, however, that contrary to this expectation that lean NO$_x$ trap catalysts as described herein demonstrate this improved performance under both lean and rich conditions.

Without wishing to be bound by theory, it is thought that the arrangement described above, in which the relative loading of the one or more platinum group metals in the first layer is lower than that of the one or more noble metals in the second layer, and/or in which the relative loading of the first ceria-containing material (i.e. in the first layer) is higher than that of the second ceria-containing material (i.e. in the second layer), produces a separation of the NO$_x$ storage and oxidation functions of the lean NO$_x$ trap catalyst into separate layers. In doing so, there is a synergistic benefit in which the separated functions each individually have increased performance relative to an equivalent catalyst in which oxidation and NO$_x$ storage functions are located within the same layer.

The one or more noble metals having reducing activity is preferably selected from the group consisting of palladium, platinum, rhodium, silver, gold, and mixtures thereof. Particularly preferably, the one or more noble metals having reducing activity comprises, consists essentially of, or consists of rhodium. One particularly preferred noble metal having reducing activity is a mixture or alloy of rhodium and platinum, preferably wherein the ratio of rhodium to platinum is from 1:2 to 2:1 on a w/w basis, and especially preferably wherein the ratio of rhodium to platinum is about 1:1 on a w/w basis. In other words, one particularly preferred noble metal having reducing activity is a 1:1 mixture or alloy of rhodium and platinum.

The one or more noble metals having reducing activity are generally in contact with the third inorganic oxide. The one or more noble metals having reducing activity are preferably supported on the third inorganic oxide.

The third inorganic oxide is preferably an oxide of Groups 2, 3, 4, 5, 13 and 14 elements The third inorganic oxide is selected from the group consisting of alumina, ceria, magnesia, silica, titania, zirconia, niobia, tantalum oxides, molybdenum oxides, tungsten oxides, and mixed oxides or composite oxides thereof. Particularly preferably, the third inorganic oxide is alumina, ceria, or a magnesia/alumina composite oxide. One especially preferred third inorganic oxide is ceria.

Preferred third inorganic oxides preferably have a surface area in the range 10 to 1500 $m^2/g$, pore volumes in the range 0.1 to 4 mL/g, and pore diameters from about 10 to 1000 Angstroms. High surface area inorganic oxides having a surface area greater than 80 $m^2/g$ are particularly preferred, e.g. high surface area ceria or alumina. Other preferred third inorganic oxides include magnesia/alumina composite oxides, optionally further comprising a cerium-containing component, e.g. ceria. In such cases the ceria may be present on the surface of the magnesia/alumina composite oxide, e.g. as a coating.

The lean $NO_x$ trap catalysts of the invention may comprise further components that are known to the skilled person. For example, the compositions of the invention may further comprise at least one binder and/or at least one surfactant. Where a binder is present, dispersible alumina binders are preferred.

The lean $NO_x$ trap catalysts of the invention may preferably further comprise a metal or ceramic substrate having an axial length L. Preferably the substrate is a flow-through monolith or a filter monolith, but is preferably a flow-through monolith substrate.

The flow-through monolith substrate has a first face and a second face defining a longitudinal direction therebetween. The flow-through monolith substrate has a plurality of channels extending between the first face and the second face. The plurality of channels extend in the longitudinal direction and provide a plurality of inner surfaces (e.g. the surfaces of the walls defining each channel). Each of the plurality of channels has an opening at the first face and an opening at the second face. For the avoidance of doubt, the flow-through monolith substrate is not a wall flow filter.

The first face is typically at an inlet end of the substrate and the second face is at an outlet end of the substrate.

The channels may be of a constant width and each plurality of channels may have a uniform channel width.

Preferably within a plane orthogonal to the longitudinal direction, the monolith substrate has from 100 to 500 channels per square inch, preferably from 200 to 400. For example, on the first face, the density of open first channels and closed second channels is from 200 to 400 channels per square inch. The channels can have cross sections that are rectangular, square, circular, oval, triangular, hexagonal, or other polygonal shapes.

The monolith substrate acts as a support for holding catalytic material. Suitable materials for forming the monolith substrate include ceramic-like materials such as cordierite, silicon carbide, silicon nitride, zirconia, mullite, spodumene, alumina-silica magnesia or zirconium silicate, or of porous, refractory metal. Such materials and their use in the manufacture of porous monolith substrates is well known in the art.

It should be noted that the flow-through monolith substrate described herein is a single component (i.e. a single brick). Nonetheless, when forming an emission treatment system, the monolith used may be formed by adhering together a plurality of channels or by adhering together a plurality of smaller monoliths as described herein. Such techniques are well known in the art, as well as suitable casings and configurations of the emission treatment system.

In embodiments wherein the lean $NO_x$ trap catalyst comprises a ceramic substrate, the ceramic substrate may be made of any suitable refractory material, e.g., alumina, silica, titania, ceria, zirconia, magnesia, zeolites, silicon nitride, silicon carbide, zirconium silicates, magnesium silicates, aluminosilicates and metallo aluminosilicates (such as cordierite and spodumene), or a mixture or mixed oxide of any two or more thereof. Cordierite, a magnesium aluminosilicate, and silicon carbide are particularly preferred.

In embodiments wherein the lean $NO_x$ trap catalyst comprises a metallic substrate, the metallic substrate may be made of any suitable metal, and in particular heat-resistant metals and metal alloys such as titanium and stainless steel as well as ferritic alloys containing iron, nickel, chromium, and/or aluminium in addition to other trace metals.

The lean $NO_x$ trap catalysts of the invention may be prepared by any suitable means. For example, the first layer may be prepared by mixing the one or more platinum group metals, a first ceria-containing material, an alkali or alkaline earth metal, and a first inorganic oxide in any order. The manner and order of addition is not considered to be particularly critical. For example, each of the components of the first layer may be added to any other component or components simultaneously, or may be added sequentially in any order. Each of the components of the first layer may be added to any other component of the first layer by impregnation, adsorption, ion-exchange, incipient wetness, precipitation, or the like, or by any other means commonly known in the art.

The second layer may be prepared by mixing the one or more noble metals, a second ceria-containing material, and a second inorganic oxide in any order. The manner and order of addition is not considered to be particularly critical. For example, each of the components of the second layer may be added to any other component or components simultaneously, or may be added sequentially in any order. Each of the components of the second layer may be added to any other component of the second layer by impregnation, adsorption, ion-exchange, incipient wetness, precipitation, or the like, or by any other means commonly known in the art.

The third layer may be prepared by mixing the one or more noble metals having reducing activity and a third inorganic oxide. The manner and order of addition is not considered to be particularly critical. For example, each of the components of the third layer may be added to any other component or components simultaneously, or may be added sequentially in any order. Each of the components of the third layer may be added to any other component of the third layer by impregnation, adsorption, ion-exchange, incipient wetness, precipitation, or the like, or by any other means commonly known in the art.

Preferably, the lean $NO_x$ trap catalyst as hereinbefore described is prepared by depositing the lean $NO_x$ trap catalyst on the substrate using washcoat procedures. A representative process for preparing the lean $NO_x$ trap catalyst using a washcoat procedure is set forth below. It will be understood that the process below can be varied according to different embodiments of the invention.

The washcoating is preferably performed by first slurrying finely divided particles of the components of the lean $NO_x$ trap catalyst as hereinbefore defined in an appropriate solvent, preferably water, to form a slurry. The slurry preferably contains between 5 to 70 weight percent solids, more preferably between 10 to 50 weight percent. Preferably, the particles are milled or subject to another comminution process in order to ensure that substantially all of the solid particles have a particle size of less than 20 microns in an average diameter, prior to forming the slurry. Additional components, such as stabilizers, binders, surfactants or promoters, may also be incorporated in the slurry as a mixture of water soluble or water-dispersible compounds or complexes.

The substrate may then be coated one or more times with the slurry such that there will be deposited on the substrate the desired loading of the lean $NO_x$ trap catalyst.

Preferably the first layer is supported/deposited directly on the metal or ceramic substrate. By "directly on" it is meant that there are no intervening or underlying layers present between the first layer and the metal or ceramic substrate.

Preferably the second layer is deposited on the first layer. Particularly preferably the second layer is deposited directly on the first layer. By "directly on" it is meant that there are no intervening or underlying layers present between the second layer and the first layer.

Preferably the third layer is deposited on the second layer. Particularly preferably the third layer is deposited directly on the second layer. By "directly on" it is meant that there are no intervening or underlying layers present between the third layer and the second layer.

Thus in a preferred lean $NO_x$ trap catalyst of the invention, the first layer is deposited directly on metal or ceramic substrate, the second layer is deposited on the first layer, and the third layer is deposited on the second layer. Such lean $NO_x$ trap catalysts may be considered to be a three layer lean $NO_x$ trap.

Preferably the first layer, second layer and/or third layer are deposited on at least 60% of the axial length L of the substrate, more preferably on at least 70% of the axial length L of the substrate, and particularly preferably on at least 80% of the axial length L of the substrate.

In particularly preferred lean $NO_x$ trap catalysts of the invention, the first layer and the second layer are deposited on at least 80%, preferably at least 95%, of the axial length L of the substrate. In some preferred lean $NO_x$ trap catalysts of the invention, the third layer is deposited on less than 100% of the axial length L of the substrate, e.g. the third layer is deposited on 80-95% of the axial length L of the substrate, such as 80%, 85%, 90%, or 95% of the axial length L of the substrate. Thus in some particularly preferred lean $NO_x$ trap catalysts of the invention, the first layer and the second layer are deposited on at least 95% of the axial length L of the substrate and the third layer is deposited on 80-95% of the axial length L of the substrate, such as 80%, 85%, 90%, or 95% of the axial length L of the substrate.

Preferably, the lean $NO_x$ trap catalyst comprises a substrate and at least one layer on the substrate. Preferably, the at least one layer comprises the first layer as hereinbefore described. This can be produced by the washcoat procedure described above. One or more additional layers may be added to the one layer of $NO_x$ adsorber catalyst composition, such as, but not limited to, the second layer as hereinbefore described and the third layer as hereinbefore described.

In embodiments wherein one or more additional layers are present in addition to the first layer, the second layer and the third layer as hereinbefore described, the one or more additional layers have a different composition to the first layer, the second layer and the third layer as hereinbefore described The one or more additional layers may comprise one zone or a plurality of zones, e.g. two or more zones. Where the one or more additional layers comprise a plurality of zones, the zones are preferably longitudinal zones. The plurality of zones, or each individual zone, may also be present as a gradient, i.e. a zone may not be of a uniform thickness along its entire length, to form a gradient. Alternatively a zone may be of uniform thickness along its entire length.

In some preferred embodiments, one additional layer, i.e. a first additional layer, is present.

Typically, the first additional layer comprises a platinum group metal (PGM) (referred to below as the "second platinum group metal"). It is generally preferred that the first additional layer comprises the second platinum group metal (PGM) as the only platinum group metal (i.e. there are no other PGM components present in the catalytic material, except for those specified).

The second PGM may be selected from the group consisting of platinum, palladium, and a combination or mixture of platinum (Pt) and palladium (Pd). Preferably, the platinum group metal is selected from the group consisting of palladium (Pd) and a combination or a mixture of platinum (Pt) and palladium (Pd). More preferably, the platinum group metal is selected from the group consisting of a combination or a mixture of platinum (Pt) and palladium (Pd).

It is generally preferred that the first additional layer is (i.e. is formulated) for the oxidation of carbon monoxide (CO) and/or hydrocarbons (HCs).

Preferably, the first additional layer comprises palladium (Pd) and optionally platinum (Pt) in a ratio by weight of 1:0 (e.g. Pd only) to 1:4 (this is equivalent to a ratio by weight of Pt:Pd of 4:1 to 0:1). More preferably, the second layer comprises platinum (Pt) and palladium (Pd) in a ratio by weight of <4:1, such as ≤3.5:1.

When the platinum group metal is a combination or mixture of platinum and palladium, then the first additional layer comprises platinum (Pt) and palladium (Pd) in a ratio by weight of 5:1 to 3.5:1, preferably 2.5:1 to 1:2.5, more preferably 1:1 to 2:1.

The first additional layer typically further comprises a support material (referred to herein below as the "second support material"). The second PGM is generally disposed or supported on the second support material.

The second support material is preferably a refractory oxide. It is preferred that the refractory oxide is selected from the group consisting of alumina, silica, ceria, silica alumina, ceria-alumina, ceria-zirconia and alumina-magnesium oxide. More preferably, the refractory oxide is selected from the group consisting of alumina, ceria, silica-alumina and ceria-zirconia. Even more preferably, the refractory oxide is alumina or silica-alumina, particularly silica-alumina.

A particularly preferred first additional layer comprises a silica-alumina support, platinum, palladium, barium, a molecular sieve, and a platinum group metal (PGM) on an alumina support, e.g. a rare earth-stabilised alumina. Particularly preferably, this preferred first additional layer comprises a first zone comprising a silica-alumina support, platinum, palladium, barium, a molecular sieve, and a second zone comprising a platinum group metal (PGM) on an alumina support, e.g. a rare earth-stabilised alumina. This preferred first additional layer may have activity as an oxidation catalyst, e.g. as a diesel oxidation catalyst (DOC).

A further preferred first additional layer layer comprises, consists of, or consists essentially of a platinum group metal on alumina. This preferred second layer may have activity as an oxidation catalyst, e.g. as a $NO_2$-maker catalyst.

A further preferred first additional layer comprises a platinum group metal, rhodium, and a cerium-containing component.

In other preferred embodiments, more than one of the preferred first additional layers described above are present, in addition to the lean $NO_x$ trap catalyst. In such embodiments, the one or more additional layers may be present in any configuration, including zoned configurations.

Preferably the first additional layer is disposed or supported on the lean $NO_x$ trap catalyst.

The first additional layer may, additionally or alternatively, be disposed or supported on the substrate (e.g. the plurality of inner surfaces of the through-flow monolith substrate).

The first additional layer may be disposed or supported on the entire length of the substrate or the lean $NO_x$ trap catalyst. Alternatively the first additional layer may be disposed or supported on a portion, e.g. 5%, 10%, 20%, 30%, 40%, 50%, 60%, 70%, 80%, 90%, or 95%, of the substrate or the lean $NO_x$ trap catalyst.

Alternatively, the first layer, second layer and/or third layer may be extruded to form a flow-through or filter substrate. In such cases the lean $NO_x$ trap catalyst is an extruded lean $NO_x$ trap catalyst comprising the first layer, second layer and/or third layer as hereinbefore described.

A further aspect of the invention is an emission treatment system for treating a flow of a combustion exhaust gas comprising the lean $NO_x$ trap catalyst as hereinbefore defined. In preferred systems, the internal combustion engine is a diesel engine, preferably a light duty diesel engine. The lean $NO_x$ trap catalyst may be placed in a close-coupled position or in the underfloor position.

The emission treatment system typically further comprises an emissions control device.

The emissions control devices is preferably downstream of the lean $NO_x$ trap catalyst.

Examples of an emissions control device include a diesel particulate filter (DPF), a lean $NO_x$ trap (LNT), a lean $NO_x$ catalyst (LNC), a selective catalytic reduction (SCR) catalyst, a diesel oxidation catalyst (DOC), a catalysed soot filter (CSF), a selective catalytic reduction filter (SCRF™) catalyst, an ammonia slip catalyst (ASC), a cold start catalyst (dCSC™) and combinations of two or more thereof. Such emissions control devices are all well known in the art.

Some of the aforementioned emissions control devices have filtering substrates. An emissions control device having a filtering substrate may be selected from the group consisting of a diesel particulate filter (DPF), a catalysed soot filter (CSF), and a selective catalytic reduction filter (SCRF™) catalyst.

It is preferred that the emission treatment system comprises an emissions control device selected from the group consisting of a lean $NO_x$ trap (LNT), an ammonia slip catalyst (ASC), diesel particulate filter (DPF), a selective catalytic reduction (SCR) catalyst, a catalysed soot filter (CSF), a selective catalytic reduction filter (SCRF™) catalyst, and combinations of two or more thereof. More preferably, the emissions control device is selected from the group consisting of a diesel particulate filter (DPF), a selective catalytic reduction (SCR) catalyst, a catalysed soot filter (CSF), a selective catalytic reduction filter (SCRF™) catalyst, and combinations of two or more thereof. Even more preferably, the emissions control device is a selective catalytic reduction (SCR) catalyst or a selective catalytic reduction filter (SCRF™) catalyst.

When the emission treatment system of the invention comprises an SCR catalyst or an SCRF™ catalyst, then the emission treatment system may further comprise an injector for injecting a nitrogenous reductant, such as ammonia, or an ammonia precursor, such as urea or ammonium formate, preferably urea, into exhaust gas downstream of the lean $NO_x$ trap catalyst and upstream of the SCR catalyst or the SCRF™ catalyst.

Such an injector may be fluidly linked to a source (e.g. a tank) of a nitrogenous reductant precursor. Valve-controlled dosing of the precursor into the exhaust gas may be regulated by suitably programmed engine management means and closed loop or open loop feedback provided by sensors monitoring the composition of the exhaust gas.

Ammonia can also be generated by heating ammonium carbamate (a solid) and the ammonia generated can be injected into the exhaust gas.

Alternatively or in addition to the injector, ammonia can be generated in situ (e.g. during rich regeneration of a LNT disposed upstream of the SCR catalyst or the SCRF™ catalyst, e.g. a lean $NO_x$ trap catalyst of the invention). Thus, the emission treatment system may further comprise an engine management means for enriching the exhaust gas with hydrocarbons.

The SCR catalyst or the SCRF™ catalyst may comprise a metal selected from the group consisting of at least one of Cu, Hf, La, Au, In, V, lanthanides and Group VIII transition metals (e.g. Fe), wherein the metal is supported on a refractory oxide or molecular sieve. The metal is preferably selected from Ce, Fe, Cu and combinations of any two or more thereof, more preferably the metal is Fe or Cu.

The refractory oxide for the SCR catalyst or the SCRF™ catalyst may be selected from the group consisting of $Al_2O_3$, $TiO_2$, $CeO_2$, $SiO_2$, $ZrO_2$ and mixed oxides containing two or more thereof. The non-zeolite catalyst can also include tungsten oxide (e.g. $V_2O_5/WO_3/TiO_2$, $WO_x/CeZrO_2$, $WO_x/ZrO_2$ or $Fe/WO_x/ZrO_2$).

It is particularly preferred when an SCR catalyst, an SCRF™ catalyst or a washcoat thereof comprises at least one molecular sieve, such as an aluminosilicate zeolite or a SAPO. The at least one molecular sieve can be a small, a medium or a large pore molecular sieve. By "small pore molecular sieve" herein we mean molecular sieves containing a maximum ring size of 8, such as CHA; by "medium pore molecular sieve" herein we mean a molecular sieve containing a maximum ring size of 10, such as ZSM-5; and by "large pore molecular sieve" herein we mean a molecular sieve having a maximum ring size of 12, such as beta. Small pore molecular sieves are potentially advantageous for use in SCR catalysts.

In the emission treatment system of the invention, preferred molecular sieves for an SCR catalyst or an SCRF™ catalyst are synthetic aluminosilicate zeolite molecular sieves selected from the group consisting of AEI, ZSM-5, ZSM-20, ERI including ZSM-34, mordenite, ferrierite, BEA including Beta, Y, CHA, LEV including Nu-3, MCM-22 and EU-1, preferably AEI or CHA, and having a silica-to-alumina ratio of about 10 to about 50, such as about 15 to about 40.

In a first emission treatment system embodiment, the emission treatment system comprises the lean $NO_x$ trap catalyst of the invention and a catalysed soot filter (CSF). The lean $NO_x$ trap catalyst is typically followed by (e.g. is upstream of) the catalysed soot filter (CSF). Thus, for example, an outlet of the lean $NO_x$ trap catalyst is connected to an inlet of the catalysed soot filter.

A second emission treatment system embodiment relates to an emission treatment system comprising the lean $NO_x$ trap catalyst of the invention, a catalysed soot filter (CSF) and a selective catalytic reduction (SCR) catalyst.

The lean $NO_x$ trap catalyst is typically followed by (e.g. is upstream of) the catalysed soot filter (CSF). The catalysed soot filter is typically followed by (e.g. is upstream of) the selective catalytic reduction (SCR) catalyst. A nitrogenous reductant injector may be arranged between the catalysed soot filter (CSF) and the selective catalytic reduction (SCR) catalyst. Thus, the catalysed soot filter (CSF) may be followed by (e.g. is upstream of) a nitrogenous reductant injector, and the nitrogenous reductant injector may be followed by (e.g. is upstream of) the selective catalytic reduction (SCR) catalyst.

In a third emission treatment system embodiment, the emission treatment system comprises the lean $NO_x$ trap catalyst of the invention, a selective catalytic reduction (SCR) catalyst and either a catalysed soot filter (CSF) or a diesel particulate filter (DPF).

In the third emission treatment system embodiment, the lean $NO_x$ trap catalyst of the invention is typically followed by (e.g. is upstream of) the selective catalytic reduction (SCR) catalyst. A nitrogenous reductant injector may be arranged between the oxidation catalyst and the selective catalytic reduction (SCR) catalyst. Thus, the catalyzed monolith substrate may be followed by (e.g. is upstream of) a nitrogenous reductant injector, and the nitrogenous reductant injector may be followed by (e.g. is upstream of) the selective catalytic reduction (SCR) catalyst. The selective catalytic reduction (SCR) catalyst are followed by (e.g. are upstream of) the catalysed soot filter (CSF) or the diesel particulate filter (DPF).

A fourth emission treatment system embodiment comprises the lean $NO_x$ trap catalyst of the invention and a selective catalytic reduction filter (SCRF™) catalyst. The lean $NO_x$ trap catalyst of the invention is typically followed by (e.g. is upstream of) the selective catalytic reduction filter (SCRF™) catalyst.

A nitrogenous reductant injector may be arranged between the lean $NO_x$ trap catalyst and the selective catalytic reduction filter (SCRF™) catalyst. Thus, the lean $NO_x$ trap catalyst may be followed by (e.g. is upstream of) a nitrogenous reductant injector, and the nitrogenous reductant injector may be followed by (e.g. is upstream of) the selective catalytic reduction filter (SCRF™) catalyst.

When the emission treatment system comprises a selective catalytic reduction (SCR) catalyst or a selective catalytic reduction filter (SCRF™) catalyst, such as in the second to fourth exhaust system embodiments described hereinabove, an ASC can be disposed downstream from the SCR catalyst or the SCRF™ catalyst (i.e. as a separate monolith substrate), or more preferably a zone on a downstream or trailing end of the monolith substrate comprising the SCR catalyst can be used as a support for the ASC.

Another aspect of the invention relates to a vehicle. The vehicle comprises an internal combustion engine, preferably a diesel engine. The internal combustion engine preferably the diesel engine, is coupled to an emission treatment system of the invention.

It is preferred that the diesel engine is configured or adapted to run on fuel, preferably diesel fuel, comprising ≤50 ppm of sulfur, more preferably ≤15 ppm of sulfur, such as ≤10 ppm of sulfur, and even more preferably ≤5 ppm of sulfur.

The vehicle may be a light-duty diesel vehicle (LDV), such as defined in US or European legislation. A light-duty diesel vehicle typically has a weight of <2840 kg, more preferably a weight of <2610 kg. In the US, a light-duty diesel vehicle (LDV) refers to a diesel vehicle having a gross weight of ≤8,500 pounds (US lbs). In Europe, the term light-duty diesel vehicle (LDV) refers to (i) passenger vehicles comprising no more than eight seats in addition to the driver's seat and having a maximum mass not exceeding 5 tonnes, and (ii) vehicles for the carriage of goods having a maximum mass not exceeding 12 tonnes.

Alternatively, the vehicle may be a heavy-duty diesel vehicle (HDV), such as a diesel vehicle having a gross weight of >8,500 pounds (US lbs), as defined in US legislation.

A further aspect of the invention is a method of treating an exhaust gas from an internal combustion engine comprising contacting the exhaust gas with the lean $NO_x$ trap catalyst as hereinbefore described. In preferred methods, the exhaust gas is a rich gas mixture. In further preferred methods, the exhaust gas cycles between a rich gas mixture and a lean gas mixture.

In some preferred methods of treating an exhaust gas from an internal combustion engine, the exhaust gas is at a temperature of about 150 to 300° C.

In further preferred methods of treating an exhaust gas from an internal combustion engine, the exhaust gas is contacted with one or more further emissions control devices, in addition to the lean $NO_x$ trap catalyst as hereinbefore described. The emissions control device or devices is preferably downstream of the lean $NO_x$ trap catalyst.

Examples of a further emissions control device include a diesel particulate filter (DPF), a lean $NO_x$ trap (LNT), a lean $NO_x$ catalyst (LNC), a selective catalytic reduction (SCR) catalyst, a diesel oxidation catalyst (DOC), a catalysed soot filter (CSF), a selective catalytic reduction filter (SCRF™) catalyst, an ammonia slip catalyst (ASC), a cold start catalyst (dCSC™) and combinations of two or more thereof. Such emissions control devices are all well known in the art.

Some of the aforementioned emissions control devices have filtering substrates. An emissions control device having a filtering substrate may be selected from the group consisting of a diesel particulate filter (DPF), a catalysed soot filter (CSF), and a selective catalytic reduction filter (SCRF™) catalyst.

It is preferred that the method comprises contacting the exhaust gas with an emissions control device selected from the group consisting of a lean $NO_x$ trap (LNT), an ammonia slip catalyst (ASC), diesel particulate filter (DPF), a selective catalytic reduction (SCR) catalyst, a catalysed soot filter (CSF), a selective catalytic reduction filter (SCRF™) catalyst, and combinations of two or more thereof. More preferably, the emissions control device is selected from the group consisting of a diesel particulate filter (DPF), a selective catalytic reduction (SCR) catalyst, a catalysed soot filter (CSF), a selective catalytic reduction filter (SCRF™) catalyst, and combinations of two or more thereof. Even more preferably, the emissions control device is a selective catalytic reduction (SCR) catalyst or a selective catalytic reduction filter (SCRF™) catalyst.

When the the method of the invention comprises contacting the exhaust gas with an SCR catalyst or an SCRF™ catalyst, then the method may further comprise the injection of a nitrogenous reductant, such as ammonia, or an ammonia precursor, such as urea or ammonium formate, preferably urea, into exhaust gas downstream of the lean $NO_x$ trap catalyst and upstream of the SCR catalyst or the SCRF™ catalyst.

Such an injection may be carried out by an injector. The injector may be fluidly linked to a source (e.g. a tank) of a nitrogenous reductant precursor. Valve-controlled dosing of the precursor into the exhaust gas may be regulated by suitably programmed engine management means and closed loop or open loop feedback provided by sensors monitoring the composition of the exhaust gas.

Ammonia can also be generated by heating ammonium carbamate (a solid) and the ammonia generated can be injected into the exhaust gas.

Alternatively or in addition to the injector, ammonia can be generated in situ (e.g. during rich regeneration of a LNT disposed upstream of the SCR catalyst or the SCRF™ catalyst). Thus, the method may further comprise enriching of the exhaust gas with hydrocarbons.

The SCR catalyst or the SCRF™ catalyst may comprise a metal selected from the group consisting of at least one of Cu, Hf, La, Au, In, V, lanthanides and Group VIII transition metals (e.g. Fe), wherein the metal is supported on a refractory oxide or molecular sieve. The metal is preferably selected from Ce, Fe, Cu and combinations of any two or more thereof, more preferably the metal is Fe or Cu.

The refractory oxide for the SCR catalyst or the SCRF™ catalyst may be selected from the group consisting of $Al_2O_3$, $TiO_2$, $CeO_2$, $SiO_2$, $ZrO_2$ and mixed oxides containing two or more thereof. The non-zeolite catalyst can also include tungsten oxide (e.g. $V_2O_5/WO_3/TiO_2$, $WO_x/CeZrO_2$, $WO_x/ZrO_2$ or $Fe/WO_x/ZrO_2$).

It is particularly preferred when an SCR catalyst, an SCRF™ catalyst or a washcoat thereof comprises at least one molecular sieve, such as an aluminosilicate zeolite or a SAPO. The at least one molecular sieve can be a small, a medium or a large pore molecular sieve. By "small pore molecular sieve" herein we mean molecular sieves containing a maximum ring size of 8, such as CHA; by "medium pore molecular sieve" herein we mean a molecular sieve containing a maximum ring size of 10, such as ZSM-5; and by "large pore molecular sieve" herein we mean a molecular sieve having a maximum ring size of 12, such as beta. Small pore molecular sieves are potentially advantageous for use in SCR catalysts.

In the method of treating an exhaust gas of the invention, preferred molecular sieves for an SCR catalyst or an SCRF™ catalyst are synthetic aluminosilicate zeolite molecular sieves selected from the group consisting of AEI, ZSM-5, ZSM-20, ERI including ZSM-34, mordenite, ferrierite, BEA including Beta, Y, CHA, LEV including Nu-3, MCM-22 and EU-1, preferably AEI or CHA, and having a silica-to-alumina ratio of about 10 to about 50, such as about 15 to about 40.

In a first embodiment, the method comprises contacting the exhaust gas with the lean $NO_x$ trap catalyst of the invention and a catalysed soot filter (CSF). The lean $NO_x$ trap catalyst is typically followed by (e.g. is upstream of) the catalysed soot filter (CSF). Thus, for example, an outlet of the lean $NO_x$ trap catalyst is connected to an inlet of the catalysed soot filter.

A second embodiment of the method of treating an exhaust gas relates to a method comprising contacting the exhaust gas with the lean $NO_x$ trap catalyst of the invention, a catalysed soot filter (CSF) and a selective catalytic reduction (SCR) catalyst.

The lean $NO_x$ trap catalyst is typically followed by (e.g. is upstream of) the catalysed soot filter (CSF). The catalysed soot filter is typically followed by (e.g. is upstream of) the selective catalytic reduction (SCR) catalyst. A nitrogenous reductant injector may be arranged between the catalysed soot filter (CSF) and the selective catalytic reduction (SCR) catalyst. Thus, the catalysed soot filter (CSF) may be followed by (e.g. is upstream of) a nitrogenous reductant injector, and the nitrogenous reductant injector may be followed by (e.g. is upstream of) the selective catalytic reduction (SCR) catalyst.

In a third embodiment of the method of treating an exhaust gas, the method comprises contacting the exhaust gas with the lean $NO_x$ trap catalyst of the invention, a selective catalytic reduction (SCR) catalyst and either a catalysed soot filter (CSF) or a diesel particulate filter (DPF).

In the third embodiment of the method of treating an exhaust gas, the lean $NO_x$ trap catalyst of the invention is typically followed by (e.g. is upstream of) the selective catalytic reduction (SCR) catalyst. A nitrogenous reductant injector may be arranged between the oxidation catalyst and the selective catalytic reduction (SCR) catalyst. Thus, the lean $NO_x$ trap catalyst may be followed by (e.g. is upstream of) a nitrogenous reductant injector, and the nitrogenous reductant injector may be followed by (e.g. is upstream of) the selective catalytic reduction (SCR) catalyst. The selective catalytic reduction (SCR) catalyst are followed by (e.g. are upstream of) the catalysed soot filter (CSF) or the diesel particulate filter (DPF).

A fourth embodiment of the method of treating an exhaust gas comprises the lean $NO_x$ trap catalyst of the invention and a selective catalytic reduction filter (SCRF™) catalyst. The lean $NO_x$ trap catalyst of the invention is typically followed by (e.g. is upstream of) the selective catalytic reduction filter (SCRF™) catalyst.

A nitrogenous reductant injector may be arranged between the lean $NO_x$ trap catalyst and the selective catalytic reduction filter (SCRF™) catalyst. Thus, the lean $NO_x$ trap catalyst may be followed by (e.g. is upstream of) a nitrogenous reductant injector, and the nitrogenous reductant injector may be followed by (e.g. is upstream of) the selective catalytic reduction filter (SCRF™) catalyst.

When the emission treatment system comprises a selective catalytic reduction (SCR) catalyst or a selective catalytic reduction filter (SCRF™) catalyst, such as in the second to fourth method embodiments described hereinabove, an ASC can be disposed downstream from the SCR catalyst or the SCRF™ catalyst (i.e. as a separate monolith substrate), or more preferably a zone on a downstream or trailing end of the monolith substrate comprising the SCR catalyst can be used as a support for the ASC.

Examples

The invention will now be illustrated by the following non-limiting examples.

Materials

All materials are commercially available and were obtained from known suppliers, unless noted otherwise.

General Preparation $Al_2O_3.CeO_2.MgO$—$BaCO_3$ composite material was formed by impregnating $Al_2O_3$ (56.14%).$CeO_2$ (6.52%).MgO (14.04%) with barium acetate and spray-drying the resultant slurry. This was followed by calcination at 650° C. for 1 hour. Target $BaCO_3$ concentration is 23.3 wt %.

Example Preparation

Preparation of [$Al_2O_3.CeO_2.MgO.Ba$].Pt.Pd.$CeO_2$—Composition A 2.07 g/in³ [$Al_2O_3.CeO_2.MgO.BaCO_3$] (prepared according to the general preparation above) was made into a slurry with distilled water and then milled to reduce the average particle size ($d_{90}$=13-15 μm). To the slurry, 30 g/ft³ Pt malonate and 6 g/ft³ Pd nitrate solution were added, and stirred until homogenous. The Pt/Pd was allowed to adsorb onto the support for 1 hour. To this slurry was added 2.1 g/in$^3$ of pre-calcined CeO$_2$ followed by 0.2 g/in$^3$ alumina binder, and stirred until homogenous to form a washcoat.
Preparation of [Al$_2$O$_3$.LaO].Pt.Pd.CeO$_2$—Composition B Pt malonate (65 gft$^{-3}$) and Pd nitrate (13 gft$^{-3}$) were added to a slurry of [Al$_2$O$_3$ (90.0%).LaO (4%)](1.2 gin$^{-3}$) in water. The Pt and Pd were allowed to adsorb to the alumina support for 1 hour before CeO$_2$ (0.3 gin$^{-3}$) was added. The resultant slurry was made into a washcoat and thickened with natural thickener (hydroxyethylcellulose).
Preparation of [Al$_2$O$_3$.LaO].Pt.Pd—Composition C Pt malonate (65 gft$^{-3}$) and Pd nitrate (13 gft$^{-3}$) were added to a slurry of [Al$_2$O$_3$ (90.0%).LaO (4%)](1.2 gin$^{-3}$) in water. The Pt and Pd were allowed to adsorb to the alumina support for 1 hour. The resultant slurry was made into a washcoat and thickened with natural thickener (hydroxyethylcellulose).
Preparation of [CeO$_2$].Rh.Pt.Al$_2$O$_3$—Composition D Rh nitrate (5 gft$^{-3}$) was added to a slurry of CeO$_2$ (0.4 gin$^{-3}$) in water. Aqueous NH$_3$ was added until pH 6.8 to promote Rh adsorption. Following this, Pt malonate (5 gft$^{-3}$) was added to the slurry and allowed to adsorb to the support for 1 hour before alumina (boehmite, 0.2 gin$^{-3}$) and binder (alumina, 0.1 gin$^{-3}$) were added. The resultant slurry was made into a washcoat.
Catalyst 1

Each of washcoats A, C and D were coated sequentially onto a ceramic or metallic monolith using standard coating procedures, dried at 100° C. and calcined at 500° C. for 45 mins.
Catalyst 2

Each of washcoats A, B and D were coated sequentially onto a ceramic or metallic monolith using standard coating procedures, dried at 100° C. and calcined at 500° C. for 45 mins.
Experimental Results Catalysts 1 and 2 were hydrothermally aged at 800° C. for 16 h, in a gas stream consisting of 10% H$_2$O, 20% 02, and balance N$_2$. They were performance tested over a steady-state emissions cycle (three cycles of 300 s lean and 10 s rich, with a target NO$_x$ exposure of 1 g) using a 1.6 litre bench mounted diesel engine. Emissions were measured pre- and post-catalyst.

Example 1

The NO$_x$ storage performance of the catalysts was assessed by measuring NO$_x$ storage efficiency as a function of NO$_x$ stored. The results from one representative cycle at 150° C., following a deactivating precondition, are shown in Table 1 below.

TABLE 1

| NO$_x$ stored | NO$_x$ storage efficiency (%) | |
|---|---|---|
| (g) | Catalyst 1 | Catalyst 2 |
| 0.1 | 92 | 96 |
| 0.2 | 87 | 92 |
| 0.3 | 79 | 84 |
| 0.4 | 67 | 73 |
| 0.5 | 53 | 58 |
| 0.6 | 39 | 43 |

It can be seen from the results in Table 1 that Catalyst 2, comprising a Ce-containing middle layer, has higher NO$_x$ storage efficiency than Catalyst 1, which does not comprise a Ce-containing middle layer.

Example 2

The NO$_x$ storage performance of the catalysts was assessed by measuring NO$_x$ storage efficiency as a function of NO$_x$ stored. The results from one representative cycle at 150° C., following a more activating precondition than that of Example 1 above, are shown in Table 2 below.

TABLE 2

| NO$_x$ stored | NO$_x$ storage efficiency (%) | |
|---|---|---|
| (g) | Catalyst 1 | Catalyst 2 |
| 0.1 | 33 | 57 |
| 0.2 | 18 | 34 |
| 0.3 | — | 18 |
| 0.4 | — | — |
| 0.5 | — | — |
| 0.6 | — | — |

It can be seen from the results in Table 2 that, similarly to in Example 1 above, Catalyst 2, comprising a Ce-containing middle layer, has higher NO$_x$ storage efficiency than Catalyst 1, which does not comprise a Ce-containing middle layer.

Example 3

The NO$_x$ storage performance of the catalysts was assessed by measuring NO$_x$ storage efficiency as a function of NO$_x$ stored. The results from one representative cycle at 200° C., following a deactivating precondition, are shown in Table 1 below.

TABLE 3

| NO$_x$ stored | NOx storage efficiency (%) | |
|---|---|---|
| (g) | Catalyst 1 | Catalyst 2 |
| 0.1 | 94 | 95 |
| 0.2 | 89 | 91 |
| 0.3 | 85 | 89 |
| 0.4 | 81 | 86 |
| 0.5 | 77 | 83 |
| 0.6 | 73 | 80 |

It can be seen from the results in Table 3 that Catalyst 2, comprising a Ce-containing middle layer, has higher NO$_x$ storage efficiency than Catalyst 1, which does not comprise a Ce-containing middle layer.

Example 4

The NO$_x$ storage performance of the catalysts was assessed by measuring NO$_x$ storage efficiency as a function of NO$_x$ stored. The results from one representative cycle at 200° C., following a deactivating precondition, are shown in Table 1 below.

TABLE 4

| NO$_x$ stored | NOx storage efficiency (%) | |
|---|---|---|
| (g) | Catalyst 1 | Catalyst 2 |
| 0.1 | 72 | 85 |
| 0.2 | 61 | 81 |

TABLE 4-continued

| NO$_x$ stored | NOx storage efficiency (%) | |
| --- | --- | --- |
| (g) | Catalyst 1 | Catalyst 2 |
| 0.3 | 45 | 69 |
| 0.4 | 36 | 58 |
| 0.5 | 30 | 47 |
| 0.6 | — | 41 |

It can be seen from the results in Table 4 that Catalyst 2, comprising a Ce-containing middle layer, has higher NO$_x$ storage efficiency than Catalyst 1, which does not comprise a Ce-containing middle layer.

Example 5

The CO oxidation performance of the catalysts was assessed by measuring CO conversion over time. The results from one representative cycle at 175° C., following an activating steady state test condition, are shown in Table 5 below.

TABLE 5

| | CO conversion efficiency (%) | |
| --- | --- | --- |
| Time (s) | Catalyst 1 | Catalyst 2 |
| 75 | 12 | 17 |
| 100 | 20 | 36 |
| 125 | 70 | 90 |
| 150 | 96 | 98 |
| 175 | 99 | 99 |

It can be seen from the results in Table 5 that Catalyst 2, comprising a Ce-containing middle layer, has higher CO conversion efficiency than Catalyst 1, which does not comprise a Ce-containing middle layer.

This is further demonstrated by the time taken to each 25% and 50% CO conversion efficiency at 175° C. for each catalyst. Catalyst 1 achieved 25% CO conversion efficiency after 108 s, and 50% CO conversion efficiency after 121 s. Catalyst 2 achieved 25% CO conversion efficiency after 85 s, and 50% CO conversion efficiency after 110 s. Catalyst 2 therefore achieves CO light-off sooner than Catalyst 1.

Example 6

The CO oxidation performance of the catalysts was assessed by measuring CO conversion over time. The results from one representative cycle at 200° C., following an activating steady state test condition, are shown in Table 6 below.

TABLE 6

| | CO conversion efficiency (%) | |
| --- | --- | --- |
| Time (s) | Catalyst 1 | Catalyst 2 |
| 75 | 15 | 25 |
| 100 | 26 | 51 |
| 125 | 78 | 95 |
| 150 | 97 | 99 |
| 175 | 99 | 99 |

It can be seen from the results in Table 4 that Catalyst 2, comprising a Ce-containing middle layer, has higher CO conversion efficiency than Catalyst 1, which does not comprise a Ce-containing middle layer.

This is further demonstrated by the time taken to each 25% and 50% CO conversion efficiency at 200° C. for each catalyst. Catalyst 1 achieved 25% CO conversion efficiency after 97 s, and 50% CO conversion efficiency after 118 s. Catalyst 2 achieved 25% CO conversion efficiency after 76 s, and 50% CO conversion efficiency after 99 s. Catalyst 2 therefore achieves CO light-off sooner than Catalyst 1.

The invention claimed is:

1. A lean NO$_x$ trap catalyst, comprising:
   i) a first layer, said first layer comprising one or more platinum group metals, a first ceria-containing material, an alkali or alkaline earth metal, and a first inorganic oxide;
   ii) a second layer, said second layer comprising one or more noble metals, a second ceria-containing material, and a second inorganic oxide; and
   iii) a third layer, said third layer comprising one or more noble metals having reducing activity and a third inorganic oxide;
   wherein the total loading of the one or more platinum group metals in the first layer is lower than the total loading of the one or more noble metals in the second layer.

2. The lean NO$_x$ trap catalyst of claim 1, wherein the ratio of the total loading of the one or more noble metals in the second layer to the total loading of the one or more platinum group metals in the first layer is at least 2:1 on a w/w basis.

3. The lean NO$_x$ trap catalyst of claim 1, wherein the total loading of the first ceria-containing material is greater than the total loading of the second ceria-containing material.

4. The lean NO$_x$ trap catalyst of claim 1, wherein the ratio of the total loading of the first ceria-containing material is greater than the total loading of the second ceria-containing material is at least 2:1 on a w/w basis.

5. The lean NO$_x$ trap catalyst of claim 1, wherein said one or more platinum group metals is a mixture or alloy of platinum and palladium wherein the ratio of platinum to palladium is from 2:1 to 12:1 on a w/w basis.

6. The lean NO$_x$ trap catalyst of claim 1, wherein the one or more platinum group metals are supported on the first ceria-containing material and the one or more noble metals are supported on the second ceria-containing material.

7. The lean NO$_x$ trap catalyst of claim 1, wherein said first ceria-containing material and the second ceria-containing material are independently selected from the group consisting of cerium oxide, a ceria-zirconia mixed oxide, and an alumina-ceria-zirconia mixed oxide.

8. The lean NO$_x$ trap catalyst of claim 1, wherein the alkali or alkaline earth metal is barium wherein the barium is present in an amount of 0.1 to 10 wt %.

9. The lean NO$_x$ trap catalyst of claim 1, wherein the first inorganic oxide, the second inorganic oxide, and the third inorganic oxide are independently selected from the group consisting of alumina, ceria, magnesia, silica, titania, zirconia, niobia, tantalum oxides, molybdenum oxides, tungsten oxides, and mixed oxides or composite oxides thereof.

10. The lean NO$_x$ trap catalyst of claim 1, wherein the first inorganic oxide, the second inorganic oxide and the third inorganic oxide are independently alumina, ceria, or a magnesia/alumina composite oxide.

11. The lean NO$_x$ trap catalyst of claim 1, wherein the first inorganic oxide is a magnesia/alumina composite oxide, the second inorganic oxide is alumina, and the third inorganic oxide is ceria.

12. The lean $NO_x$ trap catalyst of claim 1, wherein the one or more noble metals is selected from the group consisting of palladium, platinum, rhodium, silver, gold, and mixtures thereof.

13. The lean $NO_x$ trap catalyst of claim 1, wherein the one or more noble metals is a mixture or alloy of platinum and palladium, wherein the platinum to palladium is from 2:1 to 10:1 on a w/w basis.

14. The lean $NO_x$ trap catalyst of claim 1, wherein the one or more noble metals having reducing activity is selected from the group consisting of palladium, platinum, rhodium, silver, gold, and mixtures thereof.

15. The lean $NO_x$ trap catalyst of claim 1, wherein the one or more noble metals having reducing activity is a mixture or alloy of rhodium and platinum.

16. The lean $NO_x$ trap catalyst of claim 15, wherein the ratio of rhodium to platinum is from 1:2 to 2:1 on a w/w basis.

17. The lean $NO_x$ trap catalyst of claim 1, wherein the one or more noble metals having reducing activity are supported on the third inorganic oxide.

18. The lean $NO_x$ trap catalyst of claim 1, further comprising a metal or ceramic substrate having an axial length L, wherein the substrate is a flow-through monolith or a filter monolith and wherein the first layer is deposited directly on the metal or ceramic substrate, the second layer is deposited on the first layer, and the third layer is deposited on the second layer.

19. The lean $NO_x$ trap catalyst of claim 1, wherein the first layer, second layer and/or third layer are deposited on at least 60% of the axial length L of the substrate.

* * * * *